(12) United States Patent
Pacheco Da Cunha

(10) Patent No.: US 8,556,688 B2
(45) Date of Patent: Oct. 15, 2013

(54) INTEGRATED AERATOR FOR STORAGE AND DRYING SILOS

(76) Inventor: Otalicio Pacheco Da Cunha, Sao Leopoldo (BR)

( * ) Notice: Subject to any disclaimer, the term of this patent is extended or adjusted under 35 U.S.C. 154(b) by 540 days.

(21) Appl. No.: 12/739,393

(22) PCT Filed: Oct. 29, 2008

(86) PCT No.: PCT/BR2008/000329
§ 371 (c)(1),
(2), (4) Date: Apr. 22, 2010

(87) PCT Pub. No.: WO2009/055890
PCT Pub. Date: May 7, 2009

(65) Prior Publication Data
US 2010/0304656 A1  Dec. 2, 2010

(30) Foreign Application Priority Data

Oct. 30, 2007 (BR) ................................... 0704378

(51) Int. Cl.
*A01F 25/08* (2006.01)
(52) U.S. Cl.
USPC .......................................................... 454/174
(58) Field of Classification Search
USPC .................................. 454/142, 234, 241, 174
See application file for complete search history.

(56) References Cited

U.S. PATENT DOCUMENTS

| | | | |
|---|---|---|---|
| 2,089,347 A * | 8/1937 | Dondlinger | 406/41 |
| 3,104,030 A * | 9/1963 | Howlett | 222/59 |
| 3,968,997 A * | 7/1976 | Mast et al. | 406/71 |
| 4,037,527 A * | 7/1977 | Steffen | 454/182 |
| 4,375,335 A * | 3/1983 | Klein-Albenhausen | 366/15 |
| 4,382,723 A * | 5/1983 | Moller | 406/90 |
| 4,515,071 A * | 5/1985 | Zach | 454/182 |
| 4,520,714 A * | 6/1985 | Gullickson | 454/178 |
| 4,564,328 A * | 1/1986 | Loutaty et al. | 414/301 |
| 4,754,557 A * | 7/1988 | Anderson | 34/174 |
| 4,883,406 A * | 11/1989 | Arnold | 415/183 |
| 5,344,362 A * | 9/1994 | Bagley | 454/180 |
| 5,628,289 A * | 5/1997 | Chang | 123/299 |
| 5,860,221 A * | 1/1999 | Morrison et al. | 34/64 |
| 6,170,976 B1 * | 1/2001 | Sisk | 366/101 |
| 7,568,297 B2 * | 8/2009 | Pierson et al. | 34/218 |
| 8,087,816 B2 * | 1/2012 | Sisk | 366/101 |
| 2006/0054639 A1 | 3/2006 | Bonerb | |
| 2006/0111035 A1* | 5/2006 | Kallestad | 454/174 |
| 2007/0264926 A1* | 11/2007 | Sonntag | 454/182 |
| 2009/0094853 A1* | 4/2009 | Noyes et al. | 34/233 |
| 2012/0047762 A1* | 3/2012 | Neufeld et al. | 34/218 |

FOREIGN PATENT DOCUMENTS

| | | | |
|---|---|---|---|
| BR | PI0403091-5 A | * | 11/2005 |
| BR | PI0402897-0 A | * | 2/2006 |
| DE | 2626683 A1 | | 12/1977 |
| DE | 202006017366 U1 | | 3/2007 |

* cited by examiner

Primary Examiner — Kang Hu
Assistant Examiner — Anthony Kandare
(74) Attorney, Agent, or Firm — Zarley Law Firm, P.L.C.

(57) ABSTRACT

Integrated aerator for storage and drying silos installed directly over the silo's grains unloading tunnel (1), which is used for the air captation and using the same for drying and conservation of agricultural products stored in the mentioned silo, this aerator being made-up by a modular structure (2) provided of an inferior opening for air captation (3), over which is positioned a rotor (4) associated to a rotation shaft (5) with rotation bearings (6), a set that is driven by a motor (7), in a form to capture air through the opening (3), and blowing the same through a perimeter structure of shutters (8) and exits (9), which direct the blown air directly inside the silo.

4 Claims, 2 Drawing Sheets under the silo's aeration caves, the aerator not requiring the execution of specific and prior civil construction work for its installation, what eases and simplifies the procedures needed for its actual installation, decreases the time used for the same, as well as the associated costs.

INTEGRATED AERATOR FOR STORAGE AND DRYING SILOS

BACKGROUND OF THE INVENTION

The present invention pertains, in a general way, to the technological sector of equipments for drying and storing agricultural products, such as vertical or horizontal drying silo, and refers, more specifically, to a new conception of aerator, made-up by a modular structure, preferably metallic, which integrates the blowers to the silo's aeration caves, the mentioned aerator not requiring the execution of specific and prior civil construction work for its installation, what eases and simplifies the procedures needed for its actual installation, decreases the time used for the same, as well as the associated costs.

The storage and maintenance of agricultural products comprises a multiplicity of grains of the most different cultures, implies in decreasing the humidity and the temperature of the grains mass for the storage, in order to avoid the appearance of a series of pathogenic organisms that develop in humid environments and that could contaminate and even compromise the entire load of grains.

The state of art of this technological sector is made-up by storage and drying silos with aeration systems to obtain the drying, cooling, and conservation of grains. These aeration systems involve feeding ducts positioned on the silo's floor, which execute the air transport, from external chambers of decompression up to central distribution caves.

In particular, is mentioned the PI 0403091-5, "Direct integrated aeration system applicable in vertical and/or horizontal silos", title belonging to the same depositor of the present request, which refers to a system with feeding ducts with built-in fans, which integrate external structures of air captation, with gravitational shutters with the internal caves of aeration, besides integrating as well the mentioned captation structures with aeration grids positioned on the silo's floor through ducts containing inlaid fans. This system also foresees the integration of aeration caves with the grains unloading tunnel, in order to capture air in the same, and distributing it on the grains mass.

SUMMARY OF THE INVENTION

The invention presented in this descriptive report views to characterize a new conception applied to an integrated aerator for storage and drying silos, which provides greater efficiency and, principally, simplifies the installation procedures, made-up by a modular metallic structure, which integrates the blowers with the aeration caves, installed above the grains unloading tunnel, therefore, without being necessary to execute substantial civil engineering work besides the execution of the mentioned tunnel's linking opening, to enable the same to be used as air duct for the transport of air for the drying and conservation of the grains mass stored in the silo, which will be captured by the aerator and blown inside the drying silo.

BRIEF DESCRIPTION OF THE DRAWINGS

So that the present invention is fully understood and taken to practice by any technician of this technological sector, it will be explained in a clear, concise, and sufficient form to enable its reproduction, having as basis the annexed drawings listed herein below, which illustrate and subsidize the invention.

DETAILED DESCRIPTION OF THE PREFERRED EMBODIMENTS

Figure 1:
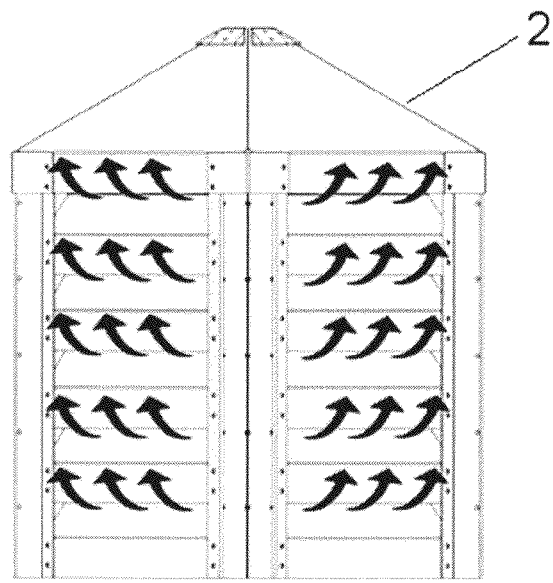
FIG. 1: Drawing in frontal view of the integrated aerator for drying silos, object of this descriptive report, in which are highlighted exit directions of the air captured from the grains unloading tunnel.
Figure 2:
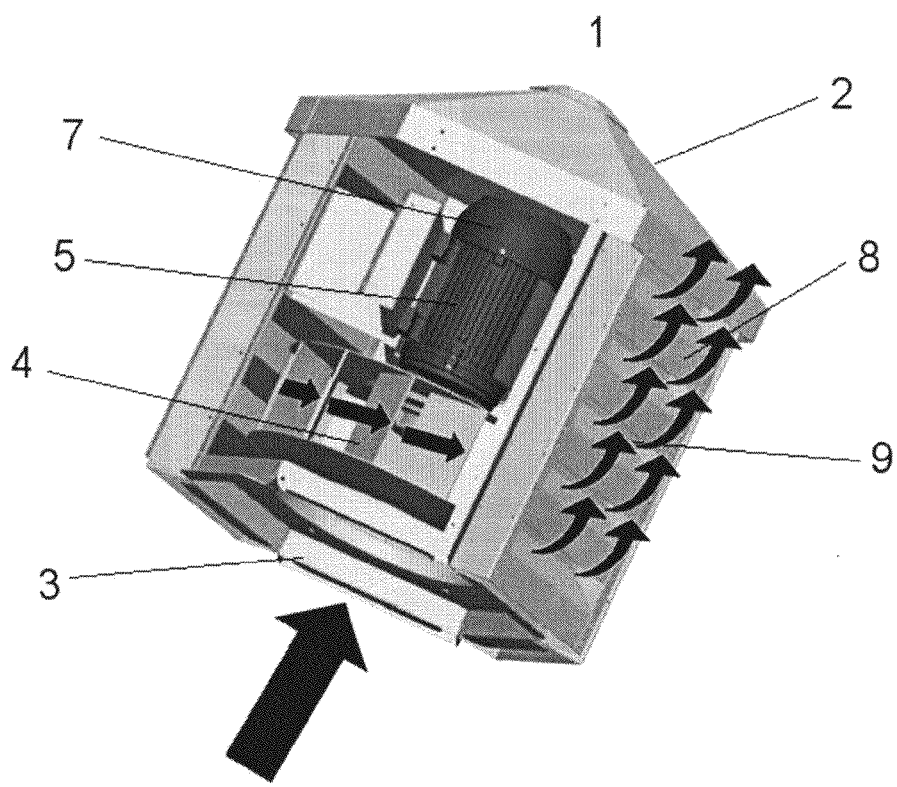
FIG. 2: Perspective drawing of the integrated aerator for drying silos, object of this descriptive report, in which the frontal part of the same was omitted, viewing to illustrate its internal structure and the way followed by the air captured from the grains unloading tunnel.
Figure 3:
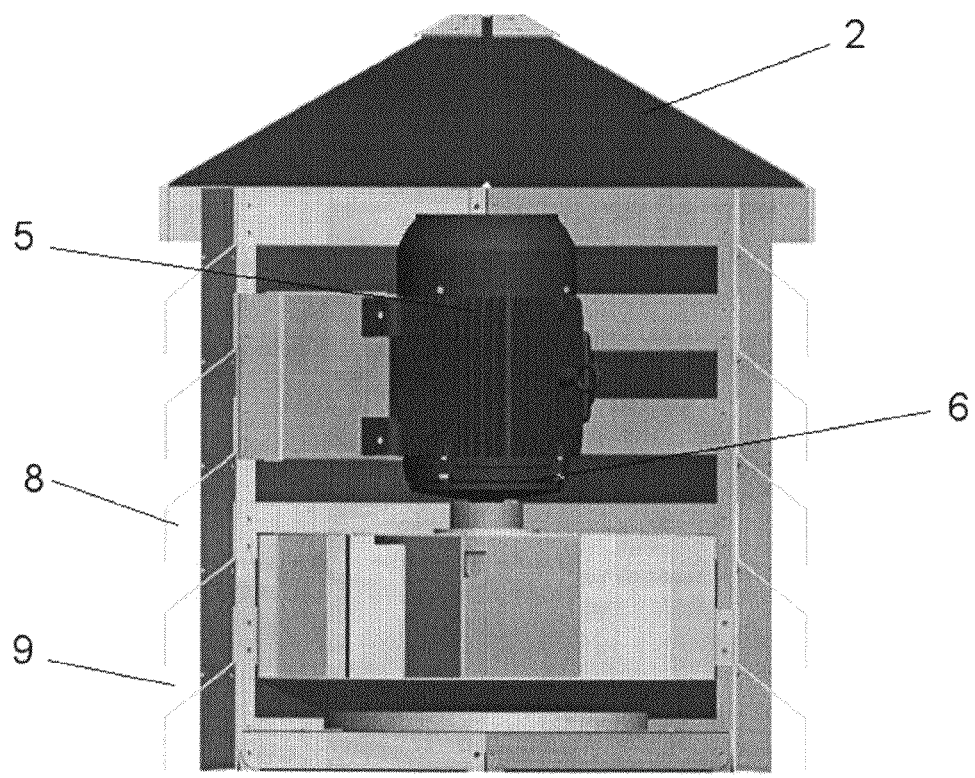
FIG. 3: Transversal cut drawing of the aerator, illustrating its component parts, and its installation directly over the grains unloading tunnel

As it can be seen on the annexed Figures, the integrated aerator for drying silos presented in the present descriptive report is installed directly over the grains unloading tunnel of the silo (1), which is used for capturing air and using the same for drying agricultural products stored in the mentioned silo, this aerator being made-up by a modular structure (2) provided with an underneath opening for air captation (3), over which is installed a rotor (4) associated to a rotation shaft (5) with rotation bearings (6) a set that is driven by a motor (7), in order to capture air through the opening (3) and blow the same through a perimeter structure of shutters (8) and exits (9), which direct the blown air directly inside the silo.

The present descriptive report presented a new and original invention, of industrial application and inventive activity, with all requirements to receive the concession of the demanded privilege.

What is claimed:

1. An integrated aerator for storage and drying silos configured to be installed directly over a grains unloading tunnel of a silo and used for capturing air, comprising:
    a modular outer structure having an underneath opening formed therein for capturing air into the modular outer structure through the underneath opening;
    a rotor disposed within the modular outer structure and positioned over the underneath opening;
    a rotation shaft associated with the rotor; and
    a motor disposed within the modular outer structure to drive the rotation shaft to rotate the rotor in order to capture air through the underneath opening and blow out the captured air through shutters and exits formed in a perimeter of the modular outer structure; and
    wherein the shutters and exits are arranged to direct the captured air inside the silo through the perimeter, and the rotor, the rotation shaft and the motor are formed as a single modular structure with the modular outer structure, and the single modular structure is configured to be retroactively installed into the storage and drying silo.

2. Integrated aerator for storage and drying silos as claimed in claim 1, and also characterized by the rotor being associated with the rotation shaft through rotation bearings.

3. An integrated aerator system for storage and drying silos, the system comprising:
    a storage and drying silo having a grain unloading opening adjacent a bottom of the storage and drying silo and positioned approximately at a center of the storage and drying silo;
    a grain unloading tunnel positioned within the storage and drying silo and positioned in alignment with and extending upwardly from the grain unloading opening; and
    an integrated aerator comprising:

a modular outer structure having an underneath opening formed therein for capturing air into the modular outer structure through the underneath opening;

a rotor disposed within the modular outer structure and positioned over the underneath opening;

a rotation shaft associated with the rotor; and a motor disposed within the modular outer structure to drive the rotation shaft to rotate the rotor in order to capture air through the underneath opening and blow out the captured air through shutters and exits formed in a perimeter of the modular outer structure;

wherein the shutters and exits are arranged to direct the captured air into an interior portion of the silo through the perimeter, and the rotor, the rotation shaft and the motor are formed as a single modular structure with the modular outer structure; and wherein the rotor is positioned within the storage and drying silo above the grain unloading opening and in fluid communication with the grain unloading tunnel and the grain unloading opening;

wherein when the rotor is rotated, air is pulled through the grain unloading opening and blown into the interior portion of the storage and drying silo by entering the integrated aerator through the underneath opening and exiting through the perimeter structure of shutters and exits thereby drying grain stored within the storage and drying silo.

4. The integrated aerator for storage and drying silos of claim 3 wherein the rotation shaft rotates upon a plurality of rotation bearings.

* * * * *